Patented Dec. 10, 1940

2,224,574

UNITED STATES PATENT OFFICE 2,224,574

AZO PIGMENT COMPOSITION

Thomas A. Martone, Wilmington, Del., assignor to E. I. du Pont de Nemours & Company, Wilmington, Del., a corporation of Delaware No Drawing. Application October 6, 1939, Serial No. 298,242

9 Claims. (Cl. 260—197)

This invention relates to new red azo pigment dyes which are made by coupling diazotized arylamines to beta naphthol, and especially to new products resulting from coupling mixtures of diazotized 3-nitro-4-amino toluene and diazotized 3-nitro-4-amino anisole with beta naphthol and to processes of producing the same.

Heretofore a red pigment of good properties, but of limited shade range, has been made by coupling diazotized m-nitro-p-toluidine with beta naphthol. There has been a need for a dark masstone, blue shade type which will retain the other valuable properties such as strength, light fastness etc. for use in pigmenting paints, printing inks, etc. In the past it has been impossible, as far as I am aware, to obtain such a type by any process variation or by mechanical mixing with other pigments.

It is among the objects of this invention to provide new red pigment dye compositions having improved bluish shades and masstone and having other properties which are technically satisfactory for the uses of pigment dyes. Another object of the invention is to provide processes for manufacturing the new compositions. Other objects of the invention will be apparent from the following description.

The objects of the invention are attained in general by providing proportioned mixtures of diazotized 3-nitro-4-amino toluene and diazotized 3-nitro-4-amino anisole and coupling with beta naphthol in a suitable medium.

The invention will be more fully set forth in the following more detailed description which includes examples that are given as illustrative embodiments of the invention and not as limitations thereof.

Example 1

A mixture of 67.5 parts of 3-nitro-4-amino toluene and 7.5 parts of 3-nitro-4-amino anisole was made and pasted in 75 parts of water. The paste was diluted with 1750 parts of water and 55 parts of 100% hydrochloric acid were added. Then 36 parts sodium nitrite dissolved in 360 parts water were added. The temperature of the mixture was adjusted to 40° F. and diazotization was carried out with stirring over a period of one hour. Just prior to coupling 67.5 parts of sodium acetate dissolved in 675 cc. water were added.

A solution of 76 parts of beta-naphthol was made by dissolving it in 225 parts water containing 22.5 parts sodium hydroxide. A solution of 26.5 parts of soda ash dissolved in 265 parts water was then added, and the combined solution was diluted with 10,000 parts of water at 90° F.

The diazo solution was added to the beta-naphthol solution and the mass was stirred ½ hour. The resulting precipitated pigment was isolated by filtration, washed free of inorganic salts and dried at 140° F.

When used as a pigment for a paint having a non-hydrous vehicle or for a printing ink the product was darker in masstone and bluer in shade than a pigment made in similar manner by coupling the diazo from 75 parts of 3-nitro-4-amino toluene with betal naphthol. The strengths of these pigments were equal.

Example 2

A mixture of 52.5 parts of 3-nitro-4-amino toluene and 25 parts of 3-nitro-4-amino anisole was treated and coupled with beta naphthol in a manner similar to that described in Example 1.

The resulting pigment was darker in masstone and bluer in shade than the pigment made by coupling diazotized 3-nitro-4-amino toluene with beta naphthol.

An attempt was made to produce the described improvement in masstone and shade by mechanically mixing the product of coupling diazotized 3-nitro-4-amino toluene with beta naphthol and the product of coupling diazotized 3-nitro-4-amino anisole with beta naphthol. These products of coupling were mechanically mixed in proportions approximately equivalent to the proportions set forth in Example 2, namely about 70% of the monazo compound from 3-nitro-4-amino toluene and about 30% of the monazo compound from 3-nitro-4-amino anisole. The mechanical mixture of pigments had a light dull masstone in a paint mixture as compared to a darker and deeper masstone in a similar paint in which the product of Example 2 was used as the pigment. The shade was much yellower than the shade produced by the product of Example 2 and the strength of the mechanical mixture of pigments was weaker than the product of Example 2.

A mechanical mixture of pigments having a masstone in paint as deep as that of the product of Example 2 was made. It contained 55% of the product of coupling diazotized 3-nitro-4-amino toluene with beta naphthol and 45% of the nitro-anisidine→beta naphthol coupling product. This mixture was much duller in masstone, yellower and duller in shade and 18% weaker than the product of Example 2 in a similar paint.

Another mechanical mixture matching the product of Example 2 in blueness of shade was made by mechanically mixing equal parts of the nitro-toluidine→beta naphthol compound and the nitro-anisidine→beta naphthol compound. This mechanical mixture was duller, the masstone was darker and it was 18% weaker than the product described in Example 2.

Without materially affecting the properties of the pigments except shade, the proportion of diazotized 3-nitro-4-amino toluene in the diazo solution can be varied in accordance with the invention from about 60% to about 99%, the remainder being diazotized 3-nitro-4-amino anisole. The preferred proportions of 3-nitro-4-amino toluene are about 65% to about 90%, the remainder being 3-nitro-4-amino anisole. Larger proportions of diazotized 3-nitro-4-amino anisole in the diazo mixture give bluer shades. Various details of the process, such as temperature, volume, the order in which the solutions of components are added and the pH value of the coupling medium can be varied as will be understood by those skilled in the art. The coupling medium may be alkaline or acid but acid coupling media are preferred when the brightest shades are desired. The preferred pH values of the coupling media are about 5 to about 6.

The reasons for the surprising difference in properties between the products of the invention and mechanical mixtures of the same analytical proportions is not understood. It is my present belief that the improvement in masstone, bluer shade and strength is the result of the formation of mixed crystals which have properties that are not possessed by the individual products of coupling, but it is to be understood that the invention is not restricted to the proposed theory. The new compositions provide pigments in blue shades of red having darker masstone than similar blue shades of red which are producible by mechanical mixtures of the same amounts of 3-nitro-4-amino toluene → beta naphthol and 3-nitro-4-amino anisole → beta naphthol. The products are useful for pigmenting various compounds, especially such compositions as paints and printing inks having nonhydrous vehicles.

From the foregoing disclosure it will be recognized that the invention is susceptible of modification without departing from the spirit and scope thereof and it is to be understood that the invention is not restricted to the specific illustrations thereof herein set forth.

I claim:

1. A pigment dye composition which comprises the product of conjointly coupling diazotized 3-nitro-4-amino toluene and diazotized 3-nitro-4-amino anisole with beta naphthol, the proportion of the 3-nitro-4-amino toluene radical in the diazo component being about 60% to about 99% and the remainder being the radical of 3-nitro-4-amino anisole.

2. A pigment dye composition which comprises the product of conjointly coupling diazotized 3-nitro-4-amino toluene and diazotized 3-nitro-4-amino anisole with beta naphthol, the proportion of the 3-nitro-4-amino toluene radical in the diazo component being about 65% to about 90% and the remainder being the radical of 3-nitro-4-amino anisole.

3. A pigment dye composition which comprises the product of conjointly coupling diazotized 3-nitro-4-amino toluene and diazotized 3-nitro-4-amino anisole with beta naphthol, the radicals of the diazo components being present in the proportion of about 67.5 parts of the radical of said toluene and about 7.5 parts of the radical of said anisole.

4. A pigment dye composition which comprises the product of conjointly coupling diazotized 3-nitro-4-amino toluene and diazotized 3-nitro-4-amino anisole with beta naphthol, the radicals of the diazo components being present in the proportion of about 52.5 parts of the radical of said toluene and about 25 parts of the radical of said anisole.

5. The process which comprises making a mixture comprising about 60% to about 99% of diazotized 3-nitro-4-amino toluene and the remainder diazotized 3-nitro-4-amino anisole, and coupling with beta naphthol.

6. The process which comprises making a mixture comprising about 60% to about 99% of diazotized 3-nitro-4-amino toluene and the remainder diazotized 3-nitro-4-amino anisole, and coupling with beta naphthol in a medium having a pH value of about 5 to about 6.

7. The process which comprises making a mixture comprising about 65% to about 90% of diazotized 3-nitro-4-amino toluene and the remainder diazotized 3-nitro-4-amino anisole, and coupling with beta naphthol.

8. The process which comprises mixing 67.5 parts of 3-nitro-4-amino toluene and 7.5 parts of 3-nitro-4-amino anisole, diazotizing in an acid medium, reducing the mineral acidity of said mixture, adding a solution of beta naphthol containing a base in sufficient amount to provide a coupling medium having a pH value of about 5 to about 6, and stirring until a coupling product is formed.

9. The process which comprises mixing 52.5 parts of 3-nitro-4-amino toluene and 25 parts of 3-nitro-4-amino anisole, diazotizing in an acid medium, reducing the mineral acidity of said mixture, adding a solution of beta naphthol containing a base in sufficient amount to provide a coupling medium having a pH value of about 5 to about 6, and stirring until a coupling product is formed.

THOMAS A. MARTONE.